(12) United States Patent
Mercuri et al.

(10) Patent No.: US 6,673,284 B2
(45) Date of Patent: Jan. 6, 2004

(54) METHOD OF MAKING FLEXIBLE GRAPHITE SHEET HAVING INCREASED ISOTROPY

(75) Inventors: Robert Angelo Mercuri, Seven Hills, OH (US); Jeffrey John Gough, Olmsted Township, OH (US); Ronald Alfred Greinke, Medina, OH (US)

(73) Assignee: Advanced Energy Technology Inc., Wilmington, DE (US)

( * ) Notice: Subject to any disclaimer, the term of this patent is extended or adjusted under 35 U.S.C. 154(b) by 53 days.

(21) Appl. No.: 10/113,384

(22) Filed: Mar. 29, 2002

(65) Prior Publication Data

US 2002/0197476 A1 Dec. 26, 2002

Related U.S. Application Data

(62) Division of application No. 09/705,289, filed on Nov. 2, 2000.

(51) Int. Cl.[7] .......................... B29B 9/00; B29B 11/12; B29B 11/14; B29B 15/00; B29C 44/00
(52) U.S. Cl. ..................... 264/41; 264/51; 264/80; 264/115; 264/119; 264/123
(58) Field of Search ................ 264/109–128, 264/41, 51, 80

(56) References Cited

U.S. PATENT DOCUMENTS

| | | | |
|---|---|---|---|
| 3,404,061 A | 10/1968 | Shane et al. ................ 161/125 |
| 4,895,713 A | 1/1990 | Greinke et al. ............. 423/448 |
| 4,988,583 A | 1/1991 | Watkins et al. ............... 429/30 |
| 5,149,518 A | * 9/1992 | Mercuri et al. ............. 423/448 |
| 5,176,863 A | * 1/1993 | Howard ...................... 264/113 |
| 5,300,370 A | 4/1994 | Washington et al. .......... 429/34 |
| 5,846,459 A | 12/1998 | Mercuri ....................... 264/42 |
| 5,902,762 A | 5/1999 | Mercuri et al. ............... 501/99 |
| 6,143,218 A | * 11/2000 | Mercuri ........................ 264/51 |

FOREIGN PATENT DOCUMENTS

JP          00173630          6/2000

OTHER PUBLICATIONS

WO 95/16287, Publication Date: Jun. 15, 1995, Intl Appln. No. PCT/CA94/00673, Inventors: Wilkinson et al.

* cited by examiner

*Primary Examiner*—Stephen J. Lechert, Jr.
(74) *Attorney, Agent, or Firm*—Waddey & Patterson P.C.; James R. Cartiglia

(57) ABSTRACT

The present invention relates to a flexible graphite sheet having increased isotropic properties. More particularly, the present invention relates to a flexible graphite sheet formed from particles of expanded natural graphite formed from graphite flake sized no more than about 30% by weight +80 mesh prior to expansion. The resulting sheet of flexible graphite exhibits improved conductive and fluid sealing properties.

5 Claims, 1 Drawing Sheet

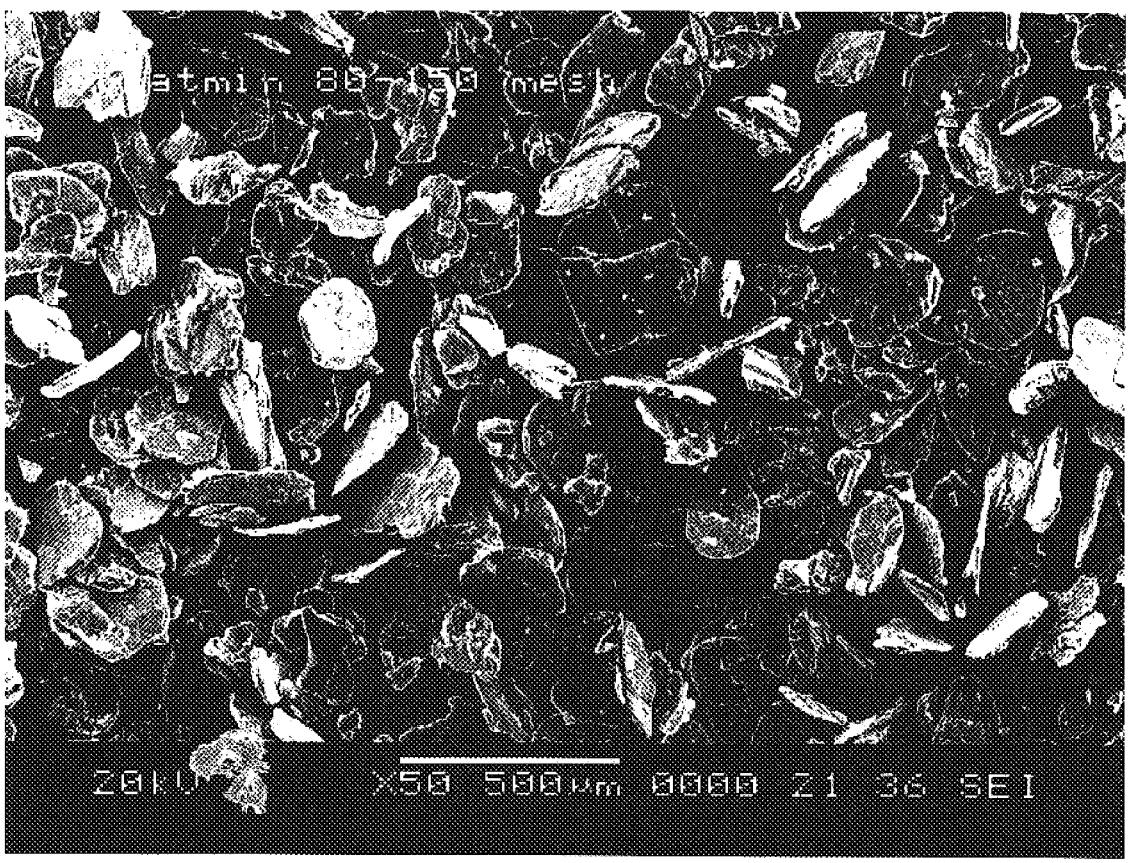

METHOD OF MAKING FLEXIBLE GRAPHITE SHEET HAVING INCREASED ISOTROPY

"This application is a divisional of our pending U.S. patent application Ser. No. 09/705,289 titled "FLEXIBLE GRAPHITE SHEET HAVING INCREASED ISOTROPY", filed Nov. 2, 2000."

FIELD OF THE INVENTION

This invention relates to flexible graphite sheet that exhibits increased isotropy as compared with prior art flexible graphite sheet. More particularly, the present invention relates to a flexible graphite sheet having increased isotropy for forming gaskets as well as the components of an electrochemical fuel cell, including fluid flow field plates, seals and gas diffusion layers therefor.

BACKGROUND OF THE INVENTION

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphites exhibit anisotropy because of their inherent structure and thus exhibit or possess many properties that are highly directional, especially thermal and electrical conductivity and fluid diffusion. Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The natural graphites suitable for manufacturing flexible graphite possess a very high degree of orientation.

As noted above, the bonding forces holding the parallel layers of carbon atoms together are only weak van der Waals forces. Graphites can be treated so that the spacing between the superposed carbon layers or laminae can be appreciably opened up so as to provide a marked expansion in the direction perpendicular to the layers, that is, in the "c" direction and thus form an expanded or intumesced graphite structure in which the laminar character of the carbon layers is substantially retained.

Natural graphite flake which has been greatly expanded and more particularly expanded so as to have a final thickness or "c" direction dimension which is at least about 80 or more times the original "c" direction dimension can be formed without the use of a binder into cohesive or integrated flexible graphite sheets of expanded graphite, e.g. webs, papers, strips, tapes, or the like. The formation of graphite particles which have been expanded to have a final thickness or "c" dimension which is at least about 80 times the original "c" direction dimension into integrated flexible sheets by compression, without the use of any binding material is believed to be possible due to the excellent mechanical interlocking, or cohesion which is achieved between the voluminously expanded graphite particles.

In addition to flexibility, the sheet material, as noted above, has also been found to possess a high degree of anisotropy with respect to thermal and electrical conductivity and fluid diffusion, comparable to the natural graphite starting material due to orientation of the expanded graphite particles substantially parallel to the opposed faces of the sheet resulting from very high compression, e.g. roll pressing. Sheet material thus produced has excellent flexibility, good strength and a very high degree of orientation.

Briefly, the process of producing flexible, binderless anisotropic graphite sheet material, such as web, paper, strip, tape, foil, mat, or the like, comprises compressing or compacting under a predetermined load and in the absence of a binder, expanded graphite particles which have a "c" direction dimension which is at least about 80 times that of the original particles so as to form a substantially flat, flexible, integrated graphite sheet. The expanded graphite particles, which generally are worm-like or vermiform in appearance, once compressed, will maintain the compression set and alignment with the opposed major surfaces of the sheet. The density and thickness of the sheet material can be varied by controlling the degree of compression. The density of the sheet material can be within the range of from about 0.08 grams per cubic centimeters (g/cc) to about 2.0 g/cc. The flexible graphite sheet material exhibits an appreciable degree of anisotropy due to the alignment of graphite particles parallel to the major opposed, parallel surfaces of the sheet, with the degree of anisotropy increasing upon roll pressing of the sheet material to increased density. In roll pressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal, electrical and fluid diffusion properties of the sheet are very different, by orders of magnitude, for the "c" and "a" directions.

This very considerable difference in properties, known as anisotropy, which is directionally dependent, can be disadvantageous in some applications. For example, in gasket applications where flexible graphite sheet is used as the gasket material and in use is held tightly between metal surfaces, the diffusion of fluid, e.g. gases or liquids, occurs more readily parallel to and between the major surfaces of the flexible graphite sheet. It would, in most instances, provide for greater gasket performance, if the resistance to fluid flow parallel to the major surfaces of the graphite sheet ("a" direction) were increased, even at the expense of reduced resistance to fluid diffusion flow transverse to the major faces of the graphite sheet ("c" direction). With respect to electrical properties, the resistivity of anisotropic flexible graphite sheet is high in the direction transverse to the major surfaces ("c" direction) of the flexible graphite sheet, and very substantially less in the direction parallel to and between the major faces of the flexible graphite sheet ("a" direction). In applications such as fluid flow field plates, seals and gas diffusion layers for fuel cells, it would be of advantage if the electrical resistance transverse to the major surfaces of the flexible graphite sheet ("c" direction) were decreased, even at the expense of an increase in electrical resistivity in the direction parallel to the major faces of the flexible graphite sheet ("a" direction).

With respect to thermal properties, the thermal conductivity of a flexible graphite sheet in a direction parallel to the upper and lower surfaces of the flexible graphite sheet is relatively high, while it is relatively very low in the "c" direction transverse to the upper and lower surfaces.

The foregoing situations are accommodated by the present invention.

SUMMARY OF THE INVENTION

A method for making flexible graphite sheet, which includes treating graphite flake sized such that no more than about 30% by weight does not pass through an 80 mesh screen (referred to as +80 mesh) (unless otherwise indicated, all references to mesh sizes herein are to U.S. standard screens) with an intercalating solution to obtain heat expandable, intercalated graphite flake; exposing the graphite flake to an elevated temperature to exfoliate the flake into expanded particles of graphite; and passing the expanded particles of graphite through pressure rolls to form a compressed sheet formed of said blended mixture, the compressed sheet having opposed major surfaces. In other words, the graphite flake employed is sized such that at least about 70% by weight passes through an 80 mesh screen. The graphite flake most useful in the invention is sized such that at least about 50% by weight passes through an 80 mesh screen but not a 140 mesh screen (referred to as 80×140 mesh) and has a moisture content of no greater than about 1.0%.

In a preferred embodiment of the invention, transverse fluid channels are formed in the compressed sheet by mechanically impacting a surface of the sheet to displace graphite within the sheet at a plurality of predetermined locations, and at least one groove is formed in at least one of the surfaces of the sheet by mechanically impacting an opposed surface of the sheet.

The invention also comprises a flexible graphite sheet made in accordance with the inventive process, itself and as a sealing gasket or an electrode component of a membrane electrode assembly comprising a pair of electrodes and an ion exchange membrane positioned between the electrodes.

BRIEF DESCRIPTION OF THE DRAWING

The FIGURE is a scanning view electron microscope (SEM) at an original magnification of 50× showing natural graphite flake sized in the range 80×140 mesh.

DETAILED DESCRIPTION OF THE INVENTION

Graphite is a crystalline form of carbon comprising atoms bonded in flat layered planes with weaker bonds between the planes. By treating particles of graphite with an intercalant of, e.g., a solution of sulfuric and nitric acid, the crystal structure of the graphite reacts to form a compound of graphite and the intercalant. Grinding, milling and other mechanical treatment of graphite can change the crystal orientation of graphite and the effectiveness of the intercalant. The graphite flake used in the present invention is sized such that no more than about 30% by weight of the flake is +80 mesh (U.S. standard screen). That is, no more than about 30% of the flake does not pass through an 80 mesh screen; put the other way, at least about 70% by weight of the flake passes through an 80 mesh screen. Most advantageously, graphite flake is sized at least about 50% by weight 80×140 mesh, U.S. standard screen (that is, at least about 50% of the flake passes through an 80 mesh screen but not a 140 mesh screen) and has a moisture content of no greater than about 1.0%.

The treated intercalated particles of graphite are known as particles of "expandable graphite." Upon exposure to high temperature, the particles of intercalated graphite undergo intumescence and expand (or exfoliate) in dimension as much as about 80 or more times its original volume in an accordion-like fashion in the c-direction, i.e. in the direction perpendicular to the crystalline planes of the graphite. The exfoliated graphite particles are vermiform in appearance, and are therefore commonly referred to as worms.

Graphite starting materials suitable for use in the present invention include highly graphitic carbonaceous materials capable of reversibly intercalating alkali metals and then expanding when exposed to heat. These highly graphitic carbonaceous materials have a degree of graphitization above about 0.80 and most preferably about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include synthetic graphites and natural graphites from various sources, as well as other carbonaceous materials such as carbons prepared by chemical vapor deposition or pyrolysis of hydrocarbons and the like. Natural graphite is most preferred.

A common method for making expandable graphite particles is described by Shane et al. in U.S. Pat. No. 3,404,061, the disclosure of which is incorporated herein by reference. In the typical practice of this method, natural graphite flakes are intercalated by dispersing the flakes in a solution containing an oxidizing agent, e.g., a mixture of nitric and sulfuric acid. The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

A preferred intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, ionic or periodic acids, or the like. Although less preferred, the intercalation solutions may contain metal halides such as ferric chloride, and ferric chloride mixed with sulfuric acid, or a halide, such as bromine as a solution of bromine and sulfuric acid or bromine in an organic solvent. Alternatively, an electric potential can be used to bring about oxidation of the graphite. Chemical species that can be introduced into the graphite crystal using electrolytic oxidation include sulfuric acid as well as other acids.

The quantity of intercalation solution may range from about 20 to 150 parts of solution by weight per 100 parts by weight of graphite flakes (pH) and more typically about 50 to 120 pH. In a preferred embodiment of the invention, after the flakes are intercalated excess solution is drained from the flakes and after washing with Water, the intercalated graphite flakes are dried and are expandable upon exposure to high temperature. In an alternative embodiment, the quantity of the intercalation solution may be limited to between about 10 to 50 pH which permits the washing step to be eliminated as taught and described in U.S. Pat. No. 4,895,713, the disclosure of which is also herein incorporated by reference.

Advantageously, the particles of graphite flake treated with intercalant can be contacted e.g. by blending or mixing, with an organic reducing agent selected from alcohols, sugars, aldehydes and esters which are reactive with the surface film of oxidizing intercalating solution at temperatures in the range of 5° C. and 125° C. Suitable specific organic agents include hexadecanoyl, octadecanol, 1-octanol, 2-octanol, decyl alcohol, 1,10 decane diol, decyl aldehyde, 1-propanol, 1,3 propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylated, diethyl oxylated, methyl formate, ethyl formate, ascorbic acid and lignin-derived compounds, such as sodium lignosulfate. The amount of organic reducing agent is suitably from about 0.5 to 4% by weight of the particles of graphite flake.

The use of an expansion aid applied prior to, during, or even after intercalation can also provide improvement, especially in terms of reduced exfoliate temperature, and/or increased expanded volume (also referred to as "worm volume") or pressure. An expansion aid in this context is preferably an organic material sufficiently soluble in the intercalant to achieve an improvement in expansion characteristics. More narrowly, organic materials of this type that contain carbon, hydrogen and oxygen, preferably exclusively, may be employed. Carboxylic acids have been found to be especially effective. A suitable carboxylic acid as the expansion aid can be selected from aromatic, aliphatic or cycloaliphatic, straight chain or branched chain, saturated and unsaturated monocarboxylic acids, di carboxylic acids and polycarboxylic acids which have at least 1 carbon atom, and preferably up to about 10 carbon atoms, which is soluble in the aqueous intercalant solution employed according to the invention in amounts effective to provide a measurable improvement of one or more aspects of exfoliate. Suitable water-miscible organic solvents can be employed to improve solubility of an organic expansion aid in the intercalant solution.

Representative examples of saturated aliphatic carboxylic acids are acids such as those of the formula $H(CH_2)_nCOOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalant have the ability to decompose formic acid, ultimately to water and carbon dioxide. Because of this, formic acid and other sensitive expansion aids are advantageously contacted with the graphite flake prior to immersion of the flake in the intercalant.

Representative of di carboxylic acids are aliphatic di carboxylic acids having 2–12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-di carboxylic acid and aromatic di carboxylic acids such as phthalic acid or terephthalic acid. Representative of alkyl esters are dimethyl oxylated and diethyl oxylated. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalant solution will preferably contain an amount of expansion aid of from about 1 to 10%, the amount being effective to enhance exfoliate. In the embodiment wherein the expansion aid is contacted with the graphite flake prior to or after immersing of the flakes in the intercalant, the expansion aid can be admixed with the graphite by suitable means, such as a V-blender, typically in an amount of from about 0.2% to about 10% by weight of the graphite flake.

After intercalating the graphite flake with an intercalating solution, preferably containing an expansion aid, and following the blending of the intercalant coated intercalated graphite flake with the organic reducing agent, the blend is typically exposed to temperatures in the range of about 5° to 125° C. to promote reaction of the reducing agent and intercalant coating. The heating period is up to about 20 hours, with shorter heating periods, e.g., at least about 10 minutes, for higher temperatures in the above-noted range. Times of one half hour or less, e.g., on the order of 10 to 25 minutes, can be employed at the higher temperatures.

The thus treated particles of graphite are hereafter referred to as "particles of intercalated graphite." Upon exposure to high temperature, of up to at least about 700° C., and preferably 700° C. to 1000° C. or higher for a few seconds the particles of intercalated graphite expand in dimension as much as about 80 to 1000 or more times their original volume in an accordion-like fashion in the c-direction, i.e., in the direction perpendicular to the crystalline planes of the graphite. In a preferred embodiment, the intercalated graphite flakes are exposed to this high temperature by exposing them to an open flame.

Flexible graphite sheet and foil are coherent, with good handling strength, and are suitably compressed, such as by roll-pressing, to a thickness preferably between about 0.075 and about 3.75 millimeters (mm) and a density that is advantageously between about 0.1 and about 1.5 g/cc. From about 1.5–30% by weight of ceramic additives, can be blended with the intercalated graphite flakes as described in U.S. Pat. No. 5,902,762 (which is incorporated herein by reference) to provide enhanced resin impregnation in the final flexible graphite product. The additives include ceramic fiber particles having a length of 0.15 to 1.5 mm. The width of the particles is suitably from 0.04 to 0.004 mm. The ceramic fiber particles are non-reactive and non-adhering to graphite and are stable at temperatures up to about 1100° C., preferably up to about 1375° C. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

Optionally, depending on the nature of the end use of the flexible graphite sheet, phosphorus is added to the intercalated unexfoliated graphite flakes of the batch by admixing with the flakes a phosphorus compound such as monoammonium phosphate in the form of a solid or solution. The phosphorus additive can be phosphoric acid (hypo-meta-ortho-pyro) acid salts for example ammonium, alumesisium, alkaline metal, and alkaline earth metal salts and can be added in solid, or as a solution, to the intercalated graphite prior to drying. The amount of phosphorus added, as phosphorus, is from 0.2 to 0.6 percent by weight (2000 to 6000 ppm) of the unexfoliated intercalated graphite flakes. The use of a phosphorus addition to the unexfoliated, intercalated graphite particles leads to increased resistance to oxidation and corrosion of the flexible graphite sheet when used in automotive gasket applications and the like.

Once the expanded graphite particles are compressed into the form of a sheet having opposed first and second major surfaces, transverse fluid channels passing through the sheet between the first and second surfaces are preferably formed, most advantageously with at least one of the surfaces having an open top groove interconnecting with a plurality of the transverse fluid channels. The transverse fluid channels passing through the sheet between the opposed first and second surfaces can be formed by mechanically impacting a surface of the sheet to displace graphite within the sheet at a plurality of predetermined locations to provide the channels with openings at the first and second opposed surfaces. In a particular embodiment, the transverse channel openings at one of the parallel opposed surfaces are smaller than their respective openings at the other opposed surface. Thus, pressurized fluid in contact with the opposed surface having the smaller channel openings enters the respective channels at an initial velocity which is greater than the velocity of the fluid exiting the respective channels, i.e., the gas exit velocity is slowed. The sheet is preferably further mechanically deformed at one of its opposed surfaces, e.g. by engraving, to provide in the surface of the article an open top groove which interconnects with a plurality of the transverse fluid channels.

DETAILED DESCRIPTION OF THE PREFERRED EMBODIMENT

A compressed mass of expanded graphite particles is provided in the form of a flexible graphite sheet. As noted above, the graphite flake used in to produce the expanded graphite particles is sized such that no more than about 30% by weight of the flake is +80 mesh (U.S. standard screen). Most preferably, graphite flake is sized at least about 50% by weight 80×140 mesh, U.S. standard screen and has a moisture content of no greater than about 1.0%. The flexible graphite sheet is provided with channels, which are preferably smooth-sided, and which pass between the opposed surfaces of the flexible graphite sheet, and are separated by walls of compressed expandable graphite. The channels preferably have openings on one of the opposed surfaces which are larger than the openings in the other opposed surface. The channels can have different configurations which are formed using flat-ended protrusion elements of different shapes, suitably formed of metal, e.g. steel and integral with and extending from the pressing roller of the impacting device. The smooth flat-ends of the protrusion elements, and the smooth bearing surfaces of a pair of rollers (or alternatively one roller and a flat metal plate), ensure deformation and complete displacement of graphite within the flexible graphite sheet, i.e. there are no rough or ragged edges or debris resulting from the channel-forming impact. Preferred protrusion elements have decreasing cross-section in the direction away from the pressing roller to provide larger channel openings on the side of the sheet that is initially impacted. The development of smooth, unobstructed surfaces surrounding channel openings, enables the free flow of fluid into and through smooth-sided channels.

In a preferred embodiment, openings on one of the opposed surfaces are larger than the channel openings in the other opposed surface, e.g. from 1 to 200 times greater in area, and result from the use of protrusion elements having converging sides. The channels are formed in the flexible graphite sheet at a plurality of pre-determined locations by mechanical impact at the predetermined locations in sheet using a mechanism comprising a pair of steel rollers with one of the rollers having truncated, i.e. flat-ended, prism-shaped protrusions which impact the surface of the flexible graphite sheet to displace graphite arid penetrate the sheet to form open channels. In practice, both rollers can be provided with "out-of-register" protrusions, and a flat metal plate, can be used in place of a smooth-surfaced roller.

This orientation of the expanded graphite particles results in anisotropic properties in flexible graphite sheets; i.e. the electrical conductivity and thermal conductivity of the sheet being substantially lower in the direction transverse to the opposed major surfaces ("c" direction) than in the direction ("a" direction) parallel to the opposed major surfaces. In the course of impacting the flexible graphite sheet to form channels, graphite is displaced within flexible graphite sheet by flat-ended protrusions to push aside graphite as it travels to and bears the smooth surface of the roller to disrupt and deform the parallel orientation of the expanded graphite particles. This region, adjacent the channels, showing disruption of the parallel orientation into an oblique, non-parallel orientation is optically observable at magnifications of 100× and higher. In effect the displaced graphite is being "die-molded" by the sides of adjacent protrusions and the smooth surface of roller. This reduces the anisotropy in the flexible graphite sheet and thus increases the electrical and thermal conductivity of the sheet in the direction transverse to the opposed major surfaces. A similar effect is achieved with frustum-conical and parallel-sided peg-shaped flat-ended protrusions.

In the practice of the present invention, a gas permeable flexible graphite sheet is provided at one of its surfaces with a continuous, open groove, a fluid inlet and a fluid outlet to constitute a gas diffusing electrode. The groove of the present invention is suitably formed by pressing a hard metal die onto the inventive flexible graphite sheet material, i.e., flexible graphite sheet having transverse channels passing therethrough from surface to surface. The die forms a continuous open groove in the surface contacted by the die. For a sheet of flexible graphite 0.15 mm to 0.32 mm thick, the open groove can be, for instance, 0.076 mm to 0.16 mm deep and 0.5 mm to 0.6.35 mm wide separated by lands that are 0.25 mm to 1.6 mm thick.

The perforated gas permeable flexible graphite sheet can be used as an electrode in an electrochemical fuel cell.

The basic elements of an electrochemical Fuel Cell are disclosed in U.S. Pat. Nos. 4,988,583 and 5,300,370 and PCT WO 95/16287 (Jun. 15, 1995) each of which is incorporated herein by reference.

The Fuel Cell comprises electrolyte in the form of a plastic e.g. a solid polymer ion exchange membrane; perforated flexible graphite sheet electrodes in accordance with the present invention; and flow field plates which respectively abut the electrodes. Pressurized fuel is circulated through grooves of fuel flow field plate and pressurized oxidant is circulated through other grooves. In operation, the fuel flow field plate becomes an anode, and the oxidant flow field plate becomes a cathode with the result that an electric potential, i.e. voltage is developed between the fuel flow field plate and the oxidant flow field plate. The above described electrochemical fuel cell is combined with others in a fuel cell stack to provide the desired level of electric power as described in the above-noted U.S. Pat. No. 5,300,370.

The operation of the Fuel Cell requires that the electrodes be porous to the fuel and oxidant fluids, e.g. hydrogen and oxygen, to permit these components to readily pass from the grooves through electrodes to contact the catalyst on the surfaces of the membrane, and enable protons derived from hydrogen to migrate through the ion exchange membrane. In the electrode of the present invention, channels are positioned to adjacently cover grooves of the flow field plates so that the pressurized gas from the grooves passes through the smaller openings of channels and exits the larger openings of channels. The initial velocity of the gas at the smaller openings is higher than the gas flow at the larger openings with the result that the gas is slowed down when it contacts the catalyst on the surface of membrane and the residence time of gas-catalyst contact is increased and the area of gas exposure at the membrane is maximized. This feature, together with the increased electrical conductivity of the flexible graphite electrode of the present invention enables more efficient fuel cell operation. Alternatively, in certain circumstances it may be desirable to have the pressurized gas flow through the larger openings of the channels and exit through the smaller openings of the channels.

In the present invention, for a flexible graphite sheet having a thickness of 0.003 inch to 0.015 inch adjacent the channels and a density of 0.5 to 1.5 g/cc, the preferred channel density (or count) is from 1000 to 3000 channels per square inch and the preferred channel size is a channel in which the ratio of the area of larger channel opening to the smaller is from 50:1 to 150:1.

As noted, flexible graphite sheet made in accordance with the present invention exhibits increased or enhanced isotropy when compared with flexible graphite sheet made using different sized (i.e., larger) graphite flakes. This increased isotropy is useful in enhancing the sealing properties of gaskets made from the flexible graphite sheet, in providing decreased electrical resistivity across the plane of the sheet in electrolytic applications such as in fuel cell components, and in providing better thermal conductivity across the plane of the flexible graphite sheet.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A method for making flexible graphite sheet, the method comprising:
    (i) providing graphite flake sized no more than about 30% by weight +80 mesh;
    (ii) treating the graphite flake with an intercalating solution to obtain heat expandable, intercalated graphite flake;
    (iii) exposing the intercalated graphite flake to an elevated temperature to exfoliate the intercalated graphite flake into expanded particles of graphite; and
    (iv) passing the expanded particles of graphite through pressure rolls to form a compressed sheet having opposed major surfaces.

2. The method of claim 1 wherein the graphite flake is sized at least about 50% by weight 80×140 mesh.

3. The method of claim 2 wherein the graphite flake has a moisture content of no greater than about 1.0%.

4. The method of claim 3 which further comprises forming transverse fluid channels in the compressed sheet by mechanically impacting a surface of the sheet to displace graphite within the sheet at a plurality of predetermined locations.

5. The method of claim 4 which further comprises forming at least one groove in at least one of the surfaces of the sheet by mechanically impacting an opposed surface of the sheet.

* * * * *